(12) United States Patent
Sauterleute et al.

(10) Patent No.: US 6,595,010 B2
(45) Date of Patent: Jul. 22, 2003

(54) AIR-CONDITIONING SYSTEM FOR AIRCRAFT

(75) Inventors: Alfred Sauterleute, Heimenkirch (DE); Michel Jonqueres, Torrance, CA (US)

(73) Assignees: Liebherr-Aerospace Lindenberg GmbH, Lindenberg/Allgau (DE); Honeywell International Inc., Morristown, NJ (US)

(*) Notice: Subject to any disclaimer, the term of this patent is extended or adjusted under 35 U.S.C. 154(b) by 0 days.

(21) Appl. No.: 09/916,665

(22) Filed: Jul. 26, 2001

(65) Prior Publication Data

US 2002/0088245 A1 Jul. 11, 2002

(30) Foreign Application Priority Data

Jul. 26, 2000 (DE) .......................... 100 36443

(51) Int. Cl.[7] .................................. F25B 9/00
(52) U.S. Cl. ..................... 62/86; 62/87; 62/401
(58) Field of Search ............. 62/86, 87, 401, 62/402; 55/47

(56) References Cited

U.S. PATENT DOCUMENTS

| | | | |
|---|---|---|---|
| 4,198,830 A | | 4/1980 | Campbell |
| 5,086,625 A | * | 2/1992 | Momose et al. ............. 62/172 |
| 5,121,610 A | * | 6/1992 | Atkinson et al. ............ 62/151 |
| 5,181,942 A | * | 1/1993 | Jain ............................. 55/31 |
| 5,277,704 A | * | 1/1994 | Miller et al. ................ 55/321 |
| 5,887,445 A | | 3/1999 | Murry et al. |
| 6,050,080 A | * | 4/2000 | Horner ....................... 60/728 |
| 6,070,418 A | | 6/2000 | Crabtree et al. |

FOREIGN PATENT DOCUMENTS

| | | |
|---|---|---|
| DE | 19935918 | 2/2001 |
| EP | 0019493 | 11/1980 |
| WO | 01/44047 | 6/2001 |

* cited by examiner

*Primary Examiner*—William E. Tapolcai
*Assistant Examiner*—Mohammad M. Ali
(74) *Attorney, Agent, or Firm*—Dilworth & Barrese LLP

(57) ABSTRACT

This invention relates to an air-conditioning system for passenger aircraft for conditioning humidity-containing air under excess pressure for air-conditioning a passenger aircraft cabin, comprising at least one compressor and two expansion turbines, where in accordance with the invention a droplet coalescing device with succeeding water separator is disposed between the expansion turbines.

20 Claims, 5 Drawing Sheets

AIR-CONDITIONING SYSTEM FOR AIRCRAFT

BACKGROUND OF THE INVENTION

This invention relates to an air-conditioning system for aircraft for conditioning humidity-containing air under excess pressure for air-conditioning an aircraft cabin.

The fresh air for air-conditioning aircraft cabins is conditioned from the air tapped from the engine at high pressure and high temperature, the so-called tap air. The air-conditioning systems utilize the pressure and temperature potential of the engine air for generating the required cooling capacity. The tap air is cooled in the course of the process of conditioning fresh air, is dehumidified and expanded to the cabin pressure of about 1 bar in ground operation and about 0.8 bar in flight operation. When conditioning fresh air, great importance is attached to air dehumidification, in order to prevent an icing of individual components of the air-conditioning system and in particular the formation of ice crystals in the fresh air to be conditioned. However, the necessity of dehumidification chiefly exists in ground operation, because in flight operation, i.e. in large altitudes, the ambient air and thus the tapped engine air is extremely dry in any case.

With reference to FIG. 1, an air-conditioning system is described below, as it is known for instance from DE 199 35 918 of the same applicant.

Via a flow control valve 12, that amount of tap air 10 of about 2 bar and 200° C. is tapped from an engine, which is required for supplying fresh air to the cabin. In ground operation, the tap air is withdrawn from an auxiliary engine with about 3 bar. The tap air is first of all passed over a primary heat exchanger 14 and cooled to about 80° C. The heat exchanger is an air—air heat exchanger, and as cooling medium ambient air 16 is used. In ground operation, the volume flow of the cooling air 16 is adjusted via a fan 18. In flight operation, the ram air supplied is sufficient as cooling medium, the volume flow being adjustable via a throttle valve. The tap air cooled to about 80° C. is compressed in a first compressor C1 and proceeding from the same is further compressed in a second compressor C2 to about 5 bar. In a main heat exchanger 20, likewise an air—air heat exchanger, this pressurized air coming from the second compressor C2 is cooled to about 50° C. by means of ambient air 16. The high pressure of about 5 bar is required for realizing a high degree of dehumidification in the subsequent water separation cycle. Therefore, this so-called aircycle system is also known as "high-pressure water separation cycle".

The high-pressure water separation cycle comprises a condenser 22, as it is also proposed for instance in EP 0,019,492 A, and a water separator 24 succeeding the condenser 22. The compressed, cooled tap air is cooled in the condenser 22 by about 15 K, water being condensed at the same time. The condensed water is then separated in the water separator 24. The air thus dehumidified is passed over two expansion turbines T1 and T2, the air being expanded to a cabin pressure of about 1 bar. Yet before the tap air emerging from the first turbine is supplied to the second expansion turbine, it is passed in a heat-exchanging manner through the condenser 22 of the high-pressure water separation cycle, in order to cool the compressed, cooled tap air to the temperature necessary for separating water in the water separator 24. The air expanded and cooled in the expansion turbine T1 is heated at the same time corresponding to the heat flow transferred in the condenser. In the high-pressure cycle, a heat exchanger 26 preceding the condenser 22 is provided in addition to the condenser 22. First of all, the compressed, cooled tap air is passed through the heat exchanger 26, before it enters the condenser 22, and subsequently the dehumidified air is passed through the heat exchanger 26, before it enters the expansion turbine T1. The main function of the heat exchanger 26 is to heat the dehumidified air and evaporate residual humidity while recovering energy at the same time, before the air enters the turbine T1. At the same time, however, the condenser 22 is relieved by the heat exchanger 26 in that before entering the condenser 22 the compressed tap air is additionally pre-cooled by about 5 K.

The conditioned air emerging from the second turbine T2 at about −10° C. and about ambient pressure is then mixed with recirculated cabin air in a mixing chamber which is not represented.

What is typical for an air-conditioning system as described herein is the fact that the energy recovered in the expansion turbines T1 and T2 is utilized for driving on the one hand the compressor C2 and C1, respectively, and on the other hand in addition the fan 18. In one case, three wheels, i.e. turbine (T2)/compressor (C1)/fan are arranged on a common shaft and form what is called the aircycle machine ACM, which is also referred to as three-wheel machine. The expansion turbine T1 together with the compressor C2 is arranged on a common shaft, but separate from the aforementioned three wheels. Therefore, this combined machine as a whole is also entirely referred to as 2+3-wheel machine.

The total system is designed for ground operation at an ambient temperature of, for instance, 38° C. To optimize the effectiveness of the heat exchanging process in the cooling shaft 17, the water obtained in the high-pressure water separation cycle with a temperature of about t=30° C. and a pressure of about 5 bar in the cooling shaft is supplied in fine droplets to be evaporated in said cooling shaft, whereby the effectiveness of the heat exchangers 20 and 14 is improved.

By means of a bypass means 28, the highly pressurized air originating from the main heat exchanger 20 can directly be supplied to the second expansion turbine T2, without passing through the water separation cycle. This may be of interest in particular when the tapped air is so dry already that it need no longer be dehumidified. This is the case in particular when flying in large flight altitudes.

With the water separation cycle from the known air-conditioning system described above, a sufficiently dry air can be achieved. It is, however, disadvantageous that the condenser and the preceding heat exchanger for dehumidifying the highly pressurized humid air have a large size. This is true in particular for the heat exchanger, as here only a small temperature gradient $\Delta T$ is available for the heat transfer function. In aircraft technology, however, it is the foremost premise to build as small and lightweight as possible.

SUMMARY OF THE INVENTION

It is therefor the object of the present invention to develop an air-conditioning system for aircraft in accordance with

- at least one compressor (C1, C2) for compressing the air (10) already supplied under an excess pressure to an even higher pressure,
- a first expansion turbine (T1) for expanding the air to a lower pressure,
- and a second expansion turbine (T2) succeeding said first one for the further expansion of the air, such that the dimension of the entire device is reduced and the weight thereof can be reduced on the whole.

In accordance with the invention, this object is solved proceeding from an air conditioning system above by the combination with the features between the first expansion turbine (T1) and the second expansion turbine (T2) a droplet coalescing device (30) with succeeding water separator (32) is disposed.

Conceptually, the solution of the above object is achieved in that the construction of the water separation cycle is changed. Instead of the large-size condenser with preceding heat exchanger a droplet coalescing device is used, behind which a water separator is provided in a manner known per se. This constructional unit used for dehydration is incorporated after the first expansion turbine. In accordance with the invention, the highly pressurized, but still humid air coming from the main heat exchanger is supplied to the first expansion turbine at about 45° C. The still humid air, which has been expanded in a first stage and in which the humidity has condensed in very fine droplets due to the decrease in temperature, is introduced from the expansion turbine into a droplet coalescing device which is used for coalescing the microfine mist-like droplets to form larger droplets, and these large droplets can subsequently be separated in the water separator. In the most simple case, the droplet coalescing device can consist of an elbow or of simple baffle plates. The turbulent air flow emerging from the expansion turbine T1, in which air flow the finely divided droplets are contained, is directed against said baffle plates. Due to the spin of the air flow or the air vortexes, the water droplets are flung onto the tube wall and the baffle plates and combined to form larger droplets on the surface thereof. These droplets are entrained by the flow towards the water separator and separated at the same. By means of the device a dehumidification of the air of 90 to 95% can be effected.

Behind the droplet coalescing device with succeeding water separator a heat exchanger may be provided, in which the air flowing from the first to the second compressor heats the air originating from the first expansion turbine and meanwhile dehumidified in the water separator, before said air is introduced into the second expansion turbine. By means of this measure, the water possibly still contained in the air is transferred to the gas phase. Thus, the air flowing into the second expansion turbine definitely no longer contains any free water. Possibly existing free water can lead to the erosion of the turbine nozzles or, for the case of outlet temperatures below the freezing point, to the icing of the second expansion turbine. At the same time, the air is heated before entering the second expansion turbine, whereby an increased turbine output is achieved. As an additional side effect, it is also achieved due to this cycle that the air originating from the first compressor is subjected to an intermediate cooling, whereby the efficiency and in particular the degree of water separation of the air-conditioning system is furthermore improved.

To improve the exchange efficiency of the heat exchanger, the same may be divided in two parts, where in the second part of the heat exchanger the air guided between the first and the second compressor preheats the air entering the first expansion turbine. The air is thereby brought to a higher temperature level, whereby the turbine output is improved.

In accordance with another embodiment of the invention, a second water separator may be provided, by means of which the air introduced into the first expansion turbine is at least partly dehydrated, before it is introduced into the heat exchanger, which like the remaining heat exchangers constitutes a regenerative heat exchanger. For the case that free water is already expected in the highly pressurized air, said free water can be withdrawn, so that the further highly pressurized water separation cycle is not additionally loaded by this free water.

In the air-conditioning system, a first bypass means may be provided for bypassing the first expansion turbine, in which case the air can directly be supplied to the second expansion turbine. The water separation cycle is bypassed in this way. This is possible in particular when the tap air consists of dry ambient air, for instance of ambient air in a large flight altitude.

For the case that the two-wheel system comprising the first expansion turbine and the second compressor should fail, the highly pressurized air can be passed via a second bypass device not into the first turbine, but directly into the droplet coalescing device, which according to this embodiment comprises an air—air heat exchanger. The highly pressurized, comparatively warm air is cooled by the cold air likewise passed through the heat exchanger, which cold air is supplied from the second expansion turbine and is likewise passed through the heat exchanger. As a result, free water is condensed in the highly pressurized air, which free water can largely be separated in the succeeding water separator.

For the case that the residual humidity content of the air introduced into the aircraft cabin is not subject to very high demands, the air emerging from the first expansion turbine can, in accordance with an alternative embodiment of the invention, directly be introduced into the water separator disposed between the first expansion turbine and the second expansion turbine. In this application, the coalescing device can be omitted. Surprisingly, experiments have shown that the turbulent flow emerging from the turbine likewise tends to coalesce to form larger droplets in the subsequent tube or elbow and at the walls as well as the spin means of the water separator, so that part of the free water in the water separator can also be withdrawn if no separately provided coalescing device is preceding said water separator.

Furthermore, protection is claimed for a device for coalescing microfine droplets, in particular for use in an air-conditioning system for aircraft with the aforementioned features. The structure of this coalescing device includes an air—air heat exchanger. Tests have confirmed that very fine mist-like droplets contained in the free water at the walls of the heat exchanger are coalesced and entrained by the flow. The larger coalesced droplets can then be separated in a water separator. In an air—air heat exchanger, approximately wave-shaped sheets are usually disposed between the parallel walls to increase the heat exchange surface. In particular at these sheets protruding into the flow, the fine droplets coalesce to form larger droplets.

In accordance with a further preferred aspect of the invention, a heat exchanger packing used as coalescing device is disposed in a housing, where a passage disposed in parallel to the heat exchanger packing is spared. Via a pivotally mounted flap, the air supplied can wholly or partly be passed over the heat exchanger packing or guided past the same in the free passage inside the housing.

BRIEF DESCRIPTION OF THE DRAWINGS

Further details and advantages of the invention will subsequently be explained in detail with reference to the embodiments represented in the Figures, in which.

DESCRIPTION OF THE PREFERRED EMBODIMENTS

Figure 1:
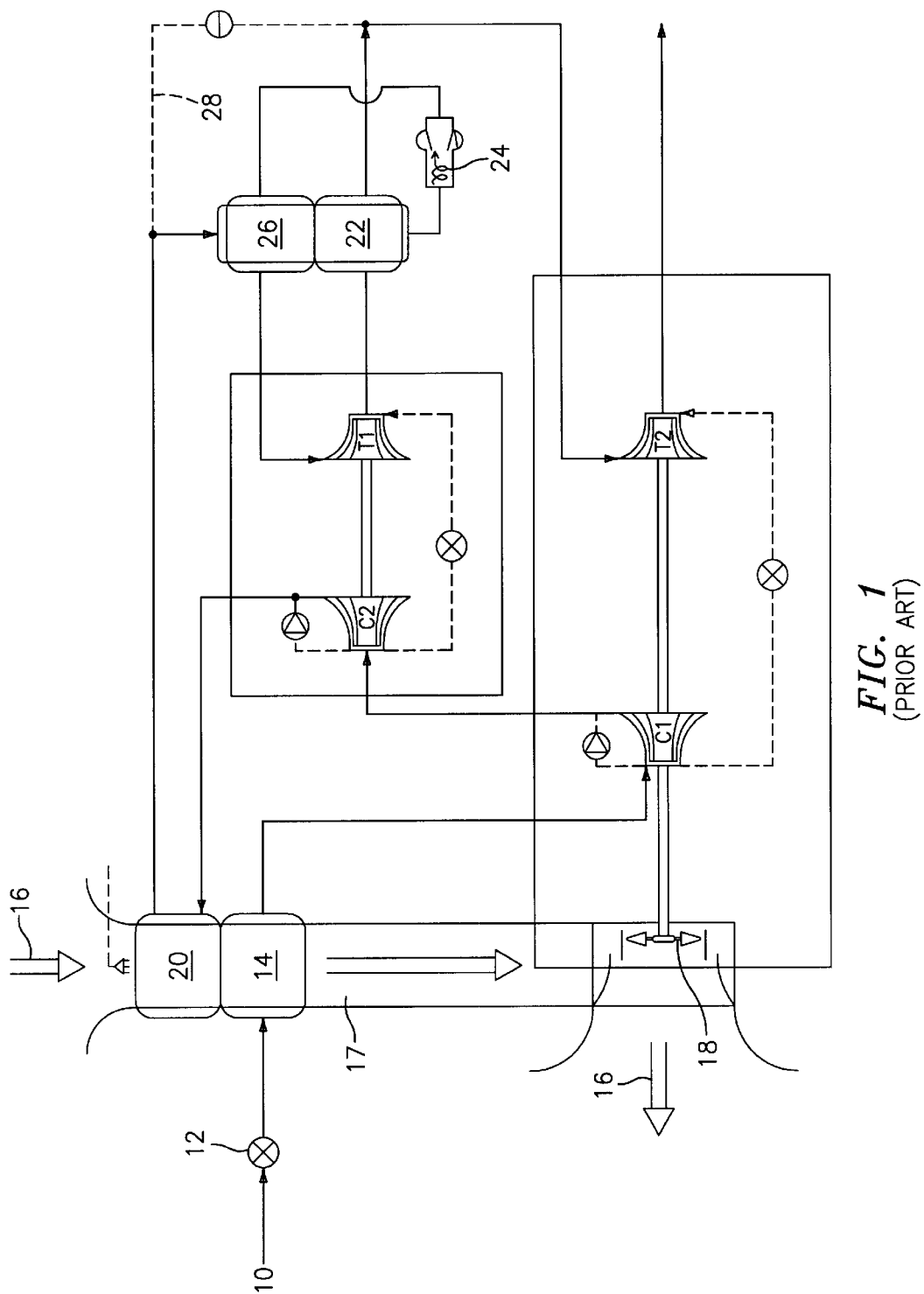
FIG. 1 shows an air-conditioning system in accordance with the prior art.
Figure 2:
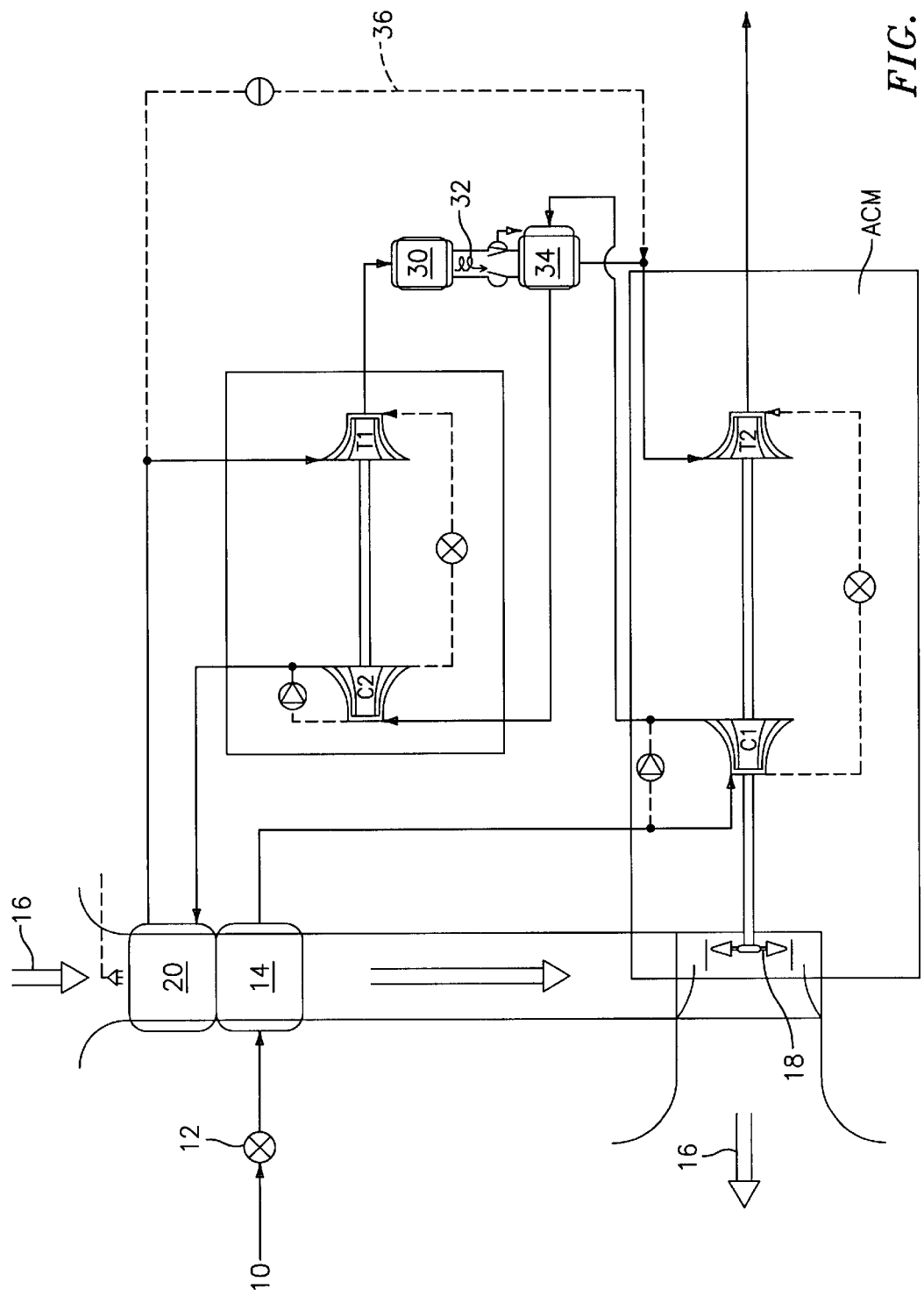
FIG. 2 shows a schematic representation of a first embodiment of the inventive air-conditioning system.

FIG. 2 shows an air-conditioning system which substantially differs from the air-conditioning system in accordance with the prior art shown in FIG. 1 by the water separating mechanism. In the air-conditioning system represented in FIG. 2, the compressor C1 of the first compressor stage together with the expansion turbine T2 and the fan 18 forms a three-wheel machine ACM. This means that the compressor C1 and the fan 11 are driven regeneratively by the energy recovered in the expansion turbine T2. The second compressor C2 is coupled with the expansion turbine T1, and it is likewise driven regeneratively by the energy recovered in the expansion turbine T2. Thus, the air-conditioning system represented in FIG. 2 is a 2+3-wheel machine. In so far, the air-conditioning system of FIG. 2 corresponds to the one in accordance with the prior art as shown in FIG. 1. Like parts are also designated with the same reference numerals.

However, the air-conditioning system in accordance with the embodiment as shown in FIG. 2 differs from the prior art in the water separation cycle. The highly pressurized air coming from the main heat exchanger 20 is supplied to the first expansion turbine T1. Due to the expansion, pressure and temperature are decreased. As a result, water is condensed. The air emerging from the first turbine T1 contains the water in the form of a very finely divided mist. This air is introduced into a droplet coalescing device 30, which in the illustrated embodiment may comprise an air—air heat exchanger packing, as it will be explained in detail with reference to FIG. 3. At the sheets of the heat exchanger packing the fine droplets coalesce to form larger droplets which are entrained by the flow and can be separated in a water separator 32 succeeding the droplet coalescing device 30. The air now dehydrated by 90% to 95% is introduced into a heat exchanger 34, where it is heated by a few Kelvin, so that the free water is transferred to the gas phase. The air thus completely liberated from free water is now passed from the heat exchanger 34 to a second expansion turbine T2, where its pressure is decreased to the desired ambient pressure as it exists in the aircraft cabin.

In the inventive air-conditioning system, dehydration no longer is effected before the first expansion turbine, but in accordance with the invention between the two existing expansion turbines. Therefore, this system is also referred to as "Interstage Water Separation".

In the heat exchanger 34, the air originating from the water separator 32 is heated in that in cross flow to the same the air is directed which flows out of the compressor C1 and is supplied to the compressor C2. In accordance with one embodiment, the air originating from the compressor C1 can have a temperature of about 100° C. with a pressure of 3.5 bar. In the heat exchanger 34, this air is cooled for instance to 90° C. In an energetically effective way, this intermediate cooling also leads to a decrease of the entire subsequent temperature level of the air to be conditioned up to the water separator. At the regenerative heat exchanger 34 a high temperature gradient ΔT exists, whereby the entire size of the heat exchanger can considerably be reduced as compared to the prior art. When behind the water separator the air enters the heat exchanger for instance with 15° C., the temperature gradient ΔT is 85 K.

In FIG. 2, reference numeral 36 designates a bypass means, by means of which the highly pressurized air coming from the main heat exchanger 20 can directly be supplied to the second expansion turbine. With this bypass means, the water separation cycle can thus be bypassed. This is recommended if the ambient air of the aircraft is very dry, as is the case for instance during the flight operation. In this case, the air-conditioning system is operated as a three-wheel system.

If no particularly high demands can be made as to the residual humidity content of the air flowing into the aircraft cabin, the droplet coalescing device 30 can be omitted for a further reduction in size in a modification of the embodiment represented in FIG. 2. Tests have shown that the air flowing out of the expansion turbine T1 can already be dehydrated in the water separator (with spin means).

Figure 3:
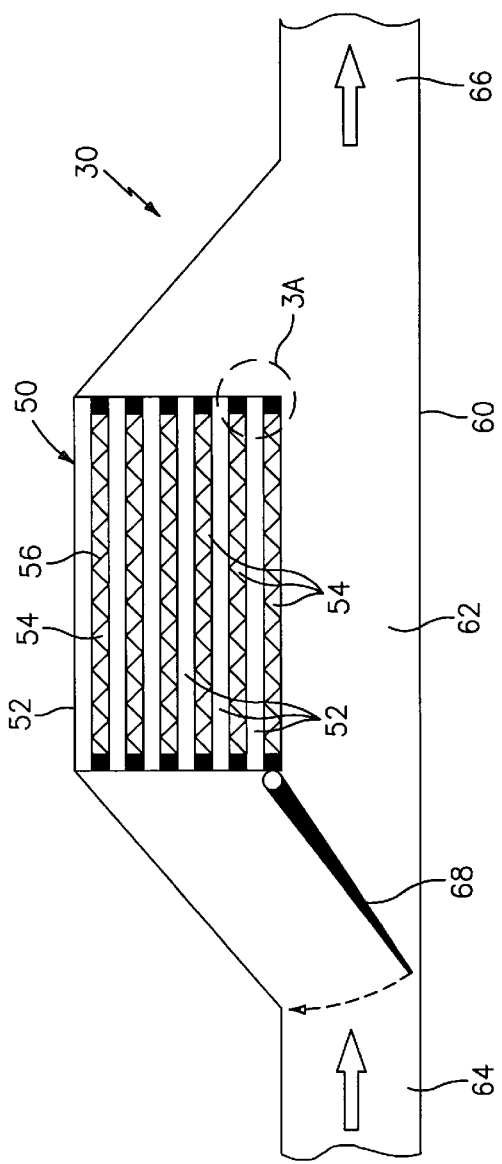
FIG. 3 shows a schematic longitudinal section through a droplet coalescing device as it is used in the present invention.
Figure 3A:
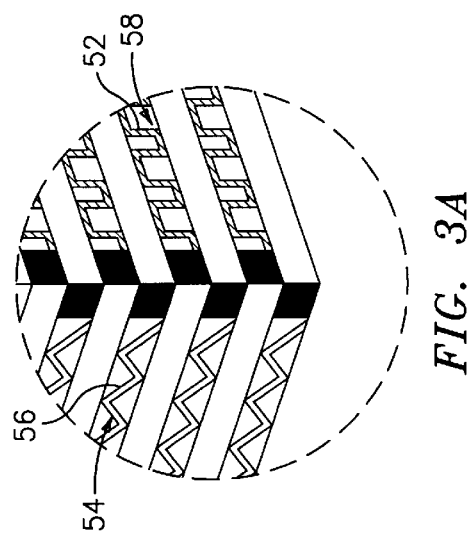
Figure 4:
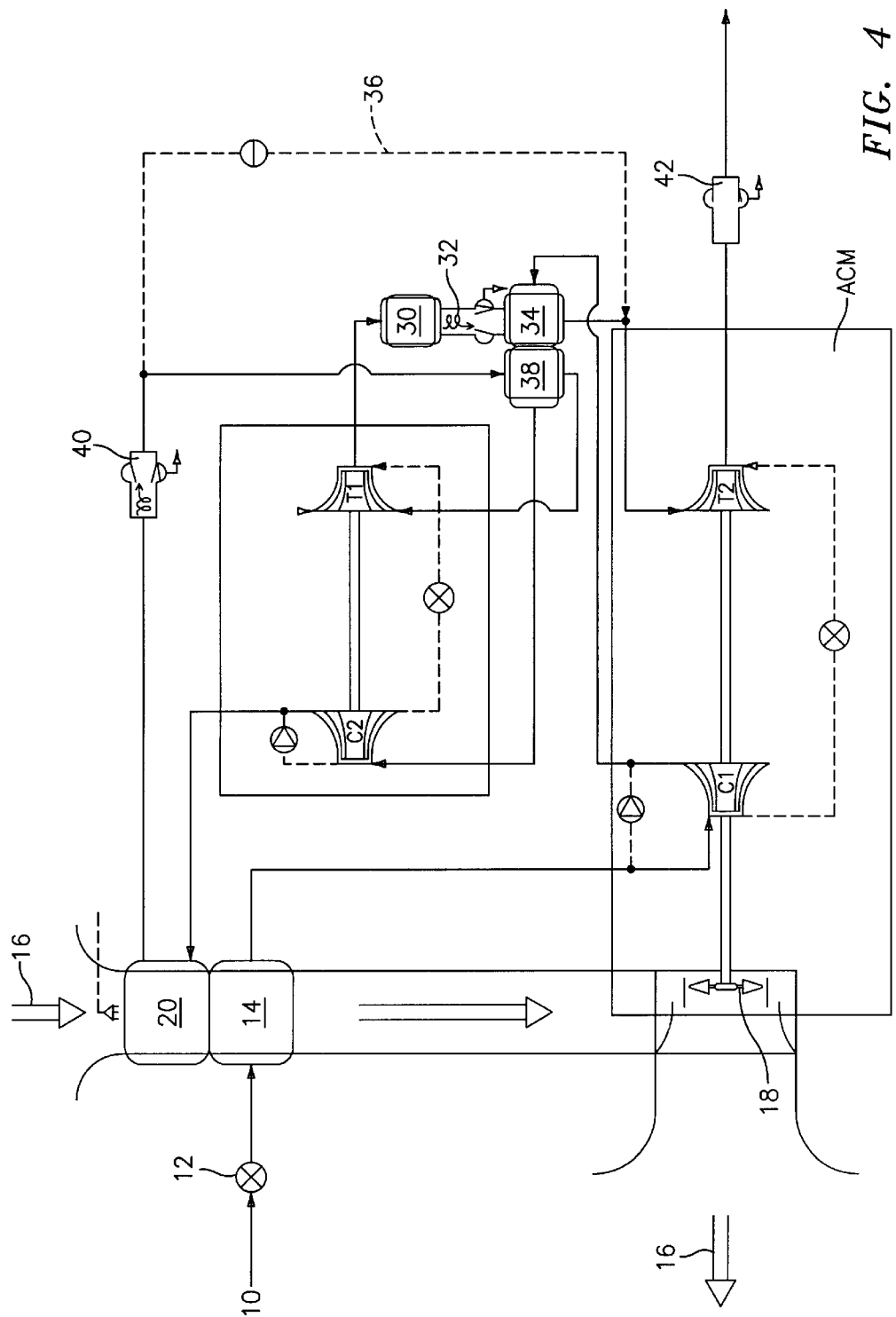
FIG. 4 shows a schematic representation of a second embodiment of the present invention.

The embodiment as shown in FIG. 4 substantially corresponds to the one shown in FIG. 3. In this case, however, the heat exchanger succeeding the water separator 32 has a two-part design. On the one hand, this is a heat exchanger 34 of the same design as the preceding embodiment, in which the air emerging from the expansion turbine T1 is guided in cross flow with respect to the air emerging from the compressor C1. What is, however, disposed behind this heat exchanger is a second heat exchanger of the same design, in which the air originating from the first heat exchanger half 34 and originating from the compressor C1 is likewise guided in a cross flow with respect to the highly pressurized air from the main heat exchanger 20. In the illustrated embodiment, two water separators 40 and 42 are provided in addition, where the water separator 40 serves to separate free water in the highly pressurized air flowing out of the main heat exchanger 20. The water separator 42 is disposed behind the second expansion turbine T2. This water separator 42 preferably is designed without spin means, in order to minimize the risk of icing.

Figure 5:
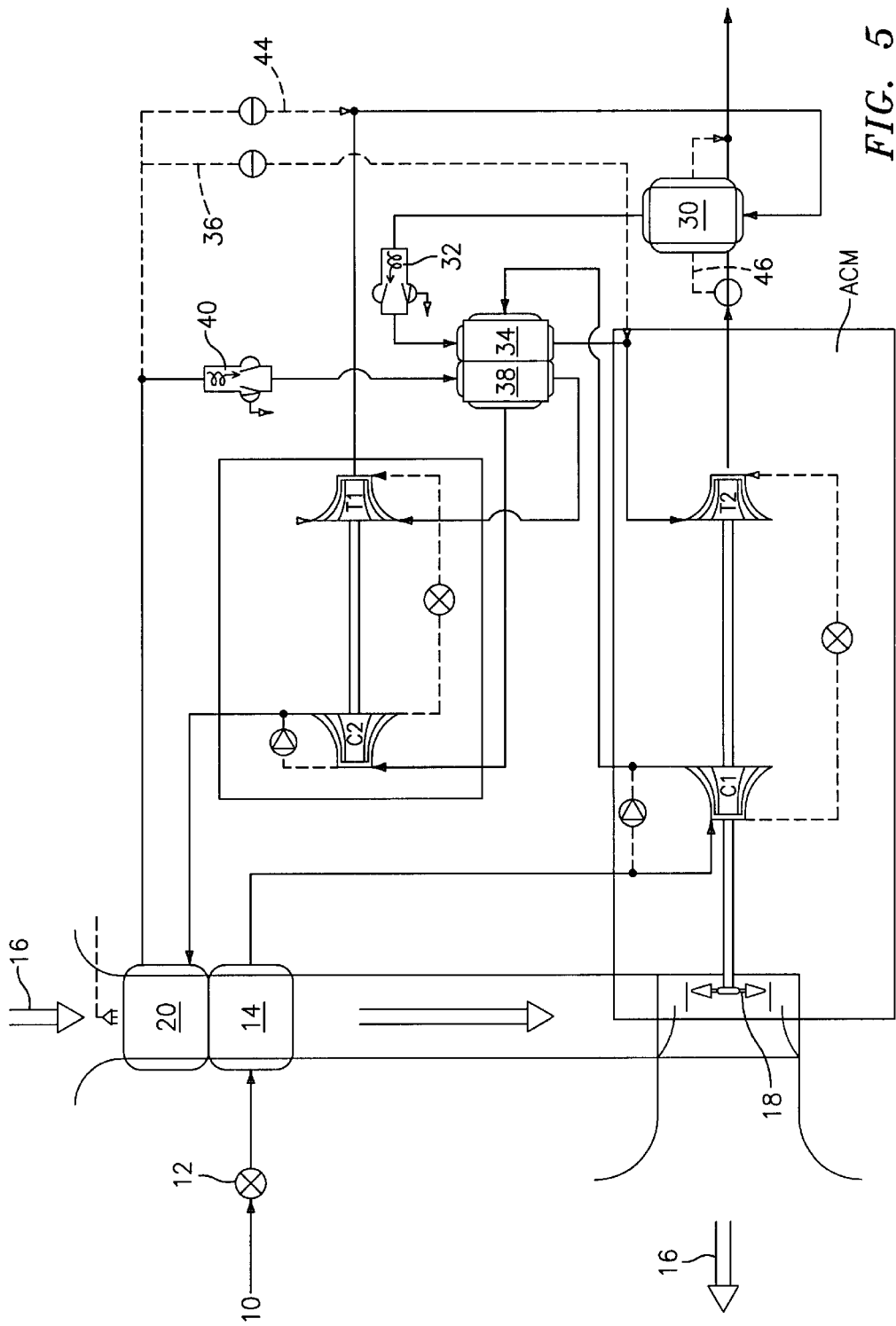
FIG. 5 shows a schematic representation of a third embodiment of the inventive air-conditioning system.

The embodiment of the invention represented in FIG. 5 substantially corresponds to the embodiment as shown in FIG. 4. Like parts are again designated with the same reference numerals. In contrast to the embodiment shown in FIG. 4, however, this embodiment has a second bypass means 44, which other than the by-pass means 36 does not supply the highly pressurized air stream from the main heat exchanger 20 directly to the second expansion turbine T2, but introduces the same into the droplet coalescing device 30.

The structure of the droplet coalescing device 30 is schematically represented in FIG. 3. The core of the droplet coalescing device is an air—air heat exchanger 50 of the usual design of a condenser. There is preferably used the design in accordance with EP 0019492. This means that this heat exchanger consists of a plurality of parallel layers, through which air of different temperatures is each passed for instance at an angle of 90° with respect to each other. To ensure a rather good heat transfer between the air volume flows of different temperatures, approximately wave-shaped sheets 56, 58 extend through the individual parallel planes. The sheets may have different shapes. The sheets 56 are each inclined with respect to the plane, whereas the sheets 58 extend parallel or at right angles to the plane (meander-like). This can clearly be seen from the enlarged detailed perspective view X. The use of the heat exchanger as droplet coalescing device is, however, not restricted to the embodiment represented by way of example. Any other built-in components may also be used as droplet coalescing devices with the same effect. Moreover, the heat exchanger may be operated with a counter-current flow or a co-current flow.

The highly pressurized humid air flows through the planes 54 with the built-in components 56. Incidentally, this is not only the case in the embodiment as shown in FIG. 5, but also in the embodiments as shown in FIGS. 2 and 4. While in the embodiments as shown in FIGS. 2 and 4 the droplet coalescing device merely comprises the heat exchanger packing 50, in the embodiment as shown in FIG. 5 the same is arranged in a housing 60 such that beside the heat exchanger packing 50 a bypass 62 has been spared. A supply line 64 leads into the housing 62, and a discharge line 66 leads out of the housing. Via the supply line 64, air coming from the expansion turbine T2 is introduced into the housing 60. By means of a pivotally mounted flap 68, said air can either by passed through the bypass passage 62 or through the passages 62 of the heat exchanger packing 50.

When in the embodiment as shown in FIG. 5 the highly pressurized comparatively warm air is directly introduced into the device 30 by means of the bypass means 44, the cold air coming from the expansion turbine T2 is preferably passed at the same time in a cross flow through the device 30. The highly pressurized air cools down, so that water is condensed and in part coalesces in the device 30 at the same time. This water is separated in the succeeding water separator 32. By means of this bypass circuit, the two-wheel machine comprising the expansion turbine T1 and the compressor C2 can be bypassed, for instance if said two-wheel machine fails in operation.

What is claimed is:

1. An air-conditioning system for aircraft for conditioning humidity-containing air under excess pressure for air-conditioning an aircraft cabin, comprising:
    at least one compressor (C1, C2) for compressing the air (10) already supplied under an excess pressure to an even higher pressure,
    a first expansion turbine (T1) for expanding the air to a lower pressure, and
    a second expansion turbine (T2) succeeding said first expansion turbine (T1) for the further expansion of the air, wherein
        between the first expansion turbine (T1) and the second expansion turbine (T2), a droplet coalescing device (30) with succeeding water separator (32) is disposed, and
        the droplet coalescing device comprises an air—air heat exchanger (30).

2. The system of claim 1, wherein the droplet coalescing device comprise at least one wall extending in flow direction.

3. The system of claim 1 having only one compressor (C2) for compressing the air (10) supplied under an excess pressure to an even higher pressure.

4. The system of claim 3, wherein the compressor (C2), the first expansion turbine (T1) and the second expansion turbine (T2) and possibly a fan (18) are disposed on a shaft.

5. The system of claim 1, wherein behind the compressor (C1) for compressing the air (10) supplied already under an excess pressure to an even higher pressure level, a second compressor (C2) is provided.

6. The system of claim 5, wherein behind the droplet coalescing device (30) with succeeding water separator (32), a heat exchanger (34) is disposed, in which the air flowing from the first compressor (C1) to the second compressor (C2) heats up the air originating from the first expansion turbine (T1) and meanwhile dehumidified in the water separator (32), before said air is introduced into the second expansion turbine (T2).

7. The system of claim 6, wherein the heat exchanger is divided in two, the air which is guided between the first compressor (C1) and the second compressor (C2) preheating the air which enters the first expansion turbine (T1) in the second part of the heat exchanger (38).

8. The system of claim 1, wherein a first bypass means (44) is provided for bypassing the first expansion turbine (T1), the air being supplied directly to the second expansion turbine (T2).

9. The system of claim 8, comprising a second bypass means (44) provided for bypassing the first turbine (T1), where the air is supplied to the droplet coalescing device (30) comprising the air—air heat exchanger, while on the other hand, the air flowing out of the expansion turbine (T2) is passed through this heat exchanger (30).

10. The system of claim 1, wherein the air emerging from the first expansion turbine (T1) is directly introduced into the water separator (32) disposed between the first expansion turbine (T1) and the second expansion turbine (T2).

11. The system of claim 1, wherein the device (30) for coalescing microfine droplets possesses structure corresponding to the air—air heat exchanger in which sheets, preferably approximately wave-shaped sheets, are disposed between parallel walls to increase the heat exchange surface.

12. The system of claim 11, wherein in a part of the housing, a heat exchanger packing is disposed, while here a parallel passage has been spared, and via a pivotally mounted flap (68) or a valve, the air supplied can wholly or partly be passed over the heat exchanger packing or be guided past the same in the free passage inside the housing.

13. An air-conditioning system for aircraft for conditioning humidity-containing air under excess pressure for air-conditioning an aircraft cabin, comprising:
    at least one compressor (C1, C2) for compressing the air (10) already supplied under an excess pressure to an even higher pressure,
    a first expansion turbine (T1) for expanding the air to a lower pressure, and
    a second expansion turbine (T2) succeeding said first expansion turbine (T1) for the further expansion of the air, wherein
        between the first expansion turbine (T1) and the second expansion turbine (T2), a droplet coalescing device (30) with succeeding water separator (32) is disposed,
        behind the droplet coalescing device (30) with succeeding water separator (32), a heat exchanger (34) is disposed, in which the air flowing from the first compressor (C1) to the second compressor (C2) heats up the air originating from the first expansion turbine (T1) and meanwhile dehumidified in the water separator (32), before said air is introduced into the second expansion turbine (T2),
        the heat exchanger is divided in two, the air which is guided between the first compressor (C1) and the second compressor (C2) preheating the air which enters the first expansion turbine (T1) in the second part of the heat exchanger (38), and
        a second water separator (40) is provided, by means of which the air introduced into the first expansion turbine (T1) is at least partly dehydrated, before it is introduced into the heat exchanger (38).

14. The system of claim 13, wherein a first bypass means (44) is provided for bypassing the first expansion turbine (T1), the air being supplied directly to the second expansion turbine (T2).

15. The system of claim 14, comprising a second bypass means (44) provided for bypassing the first turbine (T1), where the air is supplied to the droplet coalescing device (30) comprising an air—air heat exchanger, while on the other hand, the air flowing out of the expansion turbine (T2) is passed through this heat exchanger (30).

16. The system of claim 13, wherein the air emerging from the first expansion turbine (T1) is directly introduced into the water separator (32) disposed between the first expansion turbine (T1) and the second expansion turbine (T2).

17. An air-conditioning system for aircraft for conditioning humidity-containing air under excess pressure for air-conditioning an aircraft cabin, comprising:

at least one compressor (C1, C2) for compressing the air (10) already supplied under an excess pressure to an even higher pressure, a first expansion turbine (T1) for expanding the air to a lower pressure, and a second expansion turbine (T2) succeeding said first expansion turbine (T1) for the further expansion of the air, wherein between the first expansion turbine (T1) and the second expansion turbine (T2), a droplet coalescing device (30) with succeeding water separator (32) is disposed, the droplet coalescing device (30) comprises at least one wall extending in flow direction, and behind the droplet coalescing device (30) with succeeding water separator (32), a heat exchanger (34) is disposed, in which the air flowing from the first compressor (C1) to the second compressor (C2) heats up the air originating from the first expansion turbine (T1) and meanwhile dehumidified in the water separator (32), before said air is introduced into the second expansion turbine (T2).

18. The system of claim 17, wherein said at least one wall is an elbow.

19. The system of claim 17, wherein a first bypass means (44) is provided for bypassing the first expansion turbine (T1), the air being supplied directly to the second expansion turbine (T2).

20. The system of claim 19, comprising a second bypass means (44) provided for bypassing the first turbine (T1), where the air is supplied to the droplet coalescing device (30) comprising an air—air heat exchanger, while on the other hand, the air flowing out of the expansion turbine (T2) is passed through this heat exchanger (30).

* * * * *